No. 630,256. Patented Aug. 1, 1899.
J. H. McCABE.
VEHICLE RUNNING GEAR.
(Application filed Feb. 20, 1899.)
(No Model.)
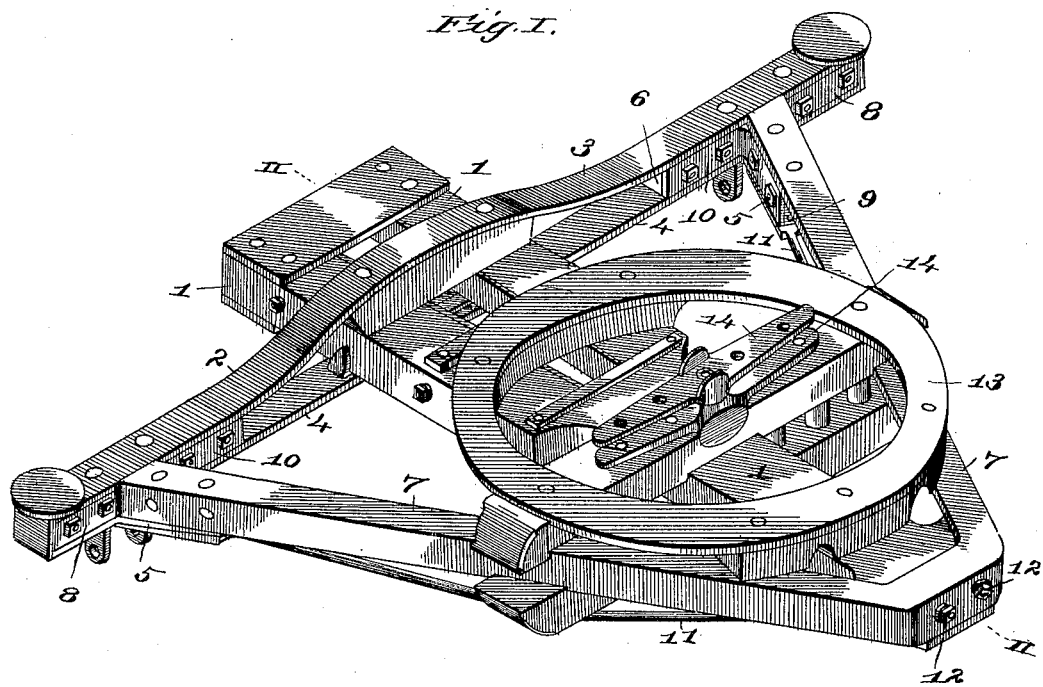
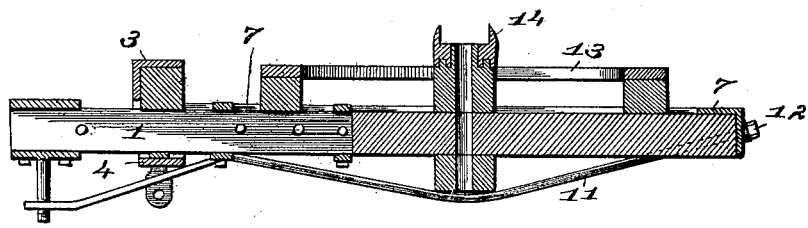
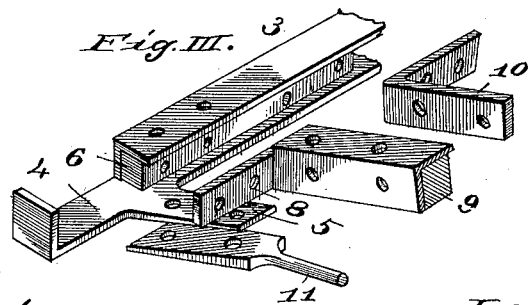
Witnesses
Inventor
Jas. H. McCabe
By Knight Bro.
Attorneys

UNITED STATES PATENT OFFICE.

JAMES H. McCABE, OF ST. LOUIS, MISSOURI, ASSIGNOR TO PAUL H. BIERMAN AND JOHANNA McCABE, OF SAME PLACE.

VEHICLE RUNNING-GEAR.

SPECIFICATION forming part of Letters Patent No. 630,256, dated August 1, 1899.

Application filed February 20, 1899. Serial No. 706,180. (No model.)

*To all whom it may concern:*

Be it known that I, JAMES H. MCCABE, a citizen of the United States, residing at the city of St. Louis, in the State of Missouri, have invented certain new and useful Improvements in Vehicle Running-Gear, of which the following is a full, clear, and exact description, reference being had to the accompanying drawings, forming part of this specification.

My invention relates to a running-gear for vehicles, and is more especially designed for that type of vehicles known as "platform spring-wagons."

The invention, broadly considered, consists in a V-shaped frame formed in one piece and constructed of angle-bar and, further, in the use of truss-rods, by which said frame is strengthened.

Figure I is a perspective view of my running-gear. Fig. II is a longitudinal sectional view taken on the line II II, Fig. I. Fig. III is a detail perspective view of the connecting portions of the splinter-beam, frame, and one of the truss-rods, the parts being shown in detached condition.

1 designates the pole-receiving crotch-piece, to which the splinter-beam 2 is connected. The splinter-beam is composed of two bars 3 and 4, the bar 4 bearing rearwardly-extending arms 5. Between the bars of the splinter-beam are filler-blocks 6.

7 designates a frame of V shape fitting over the rear end of the crotch-piece 1 and having the two arms thereof extending forwardly to the splinter-beam 2. This frame is formed of angle-bar, with one of the flanges extending downwardly, to which angle-braces 10 are connected, the said angle-braces being attached to the filler-blocks 6, so as to further secure the frame to the splinter-beam. The ends of the frame-arms rest upon the arms 5, extending from the bar 4 of the splinter-beam.

11 designates truss-rods that are connected to the arms 5, carried by the splinter-beam, the connection of these rods passing also through the ends of the frame-arms and binding the parts firmly together. The truss-rods 11 extend rearwardly and through the rear end of the crotch-piece 1 and frame 7, thereby firmly holding the said frame to the crotch-piece. The truss-rods are supplied with nuts 12 or other suitable means of fastening at their rear ends, whereby they may be securely held in place and tightened to effect the desired rigidity of the parts.

The gear is provided with the usual fifth-wheel 13, bolster-plates 14, and other appurtenances.

Having thus described my invention, the following is what I claim as new therein and desire to secure by Letters Patent:

1. In a running-gear, the combination of a crotch-piece, a V-shaped frame constructed of angle-bar fitted to said crotch-piece, and a splinter-beam across which the crotch-bar extends and to which the arms of said frame are connected; substantially as described.

2. In a running-gear the combination of a crotch-piece, a frame constructed of angle-bar fitted to said crotch-piece, a splinter-beam to which the arms of said frame are connected, and truss-rods connecting the rear ends of the said crotch-piece and frame and said splinter-beam; substantially as described.

JAMES H. McCABE.

In presence of—
E. S. KNIGHT,
G. A. TAUBERSCHMIDT.